Dec. 15, 1931.   A. E. JACOBS   1,836,472
METAL WORKING TOOL
Filed May 3, 1930
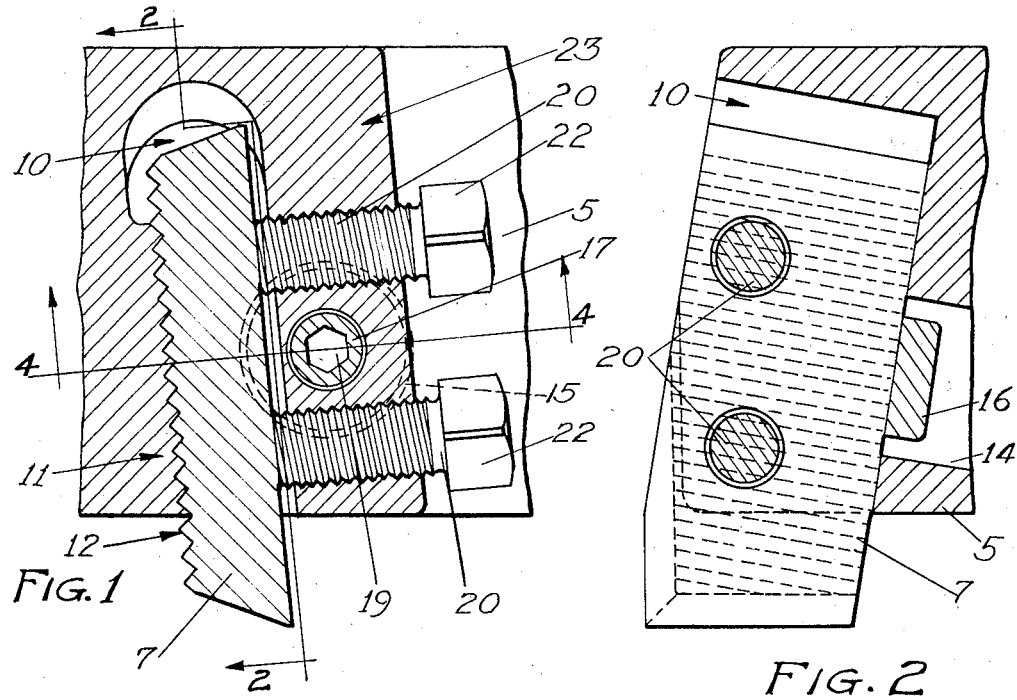
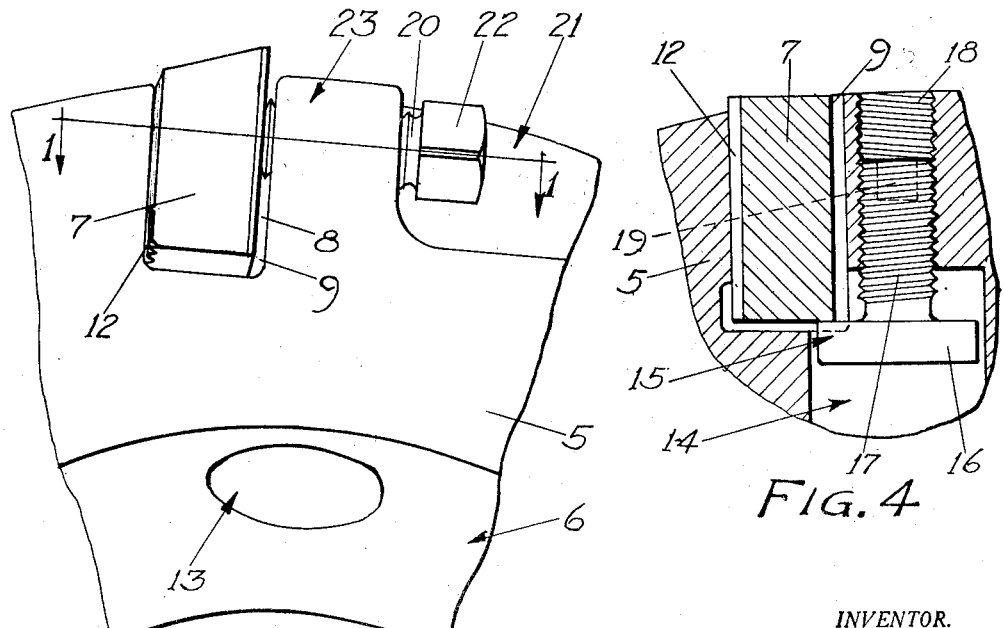
INVENTOR.
ARTHUR E. JACOBS Patented Dec. 15, 1931

1,836,472

UNITED STATES PATENT OFFICE

ARTHUR E. JACOBS, OF ROCKFORD, ILLINOIS, ASSIGNOR TO THE INGERSOLL MILLING MACHINE COMPANY, OF ROCKFORD, ILLINOIS, A CORPORATION OF ILLINOIS

METAL WORKING TOOL

Application filed May 3, 1930. Serial No. 449,424.

This invention relates in general to metal working tools and has particular reference to that type of tool in which an inserted cutter tooth is rigidly and detachably secured in a rotary head, bar or other like member.

In a tool of this type it is frequently necessary to provide for relative adjustment between the cutter tooth and the head in which it is mounted. This is true in such operations as milling, boring, and reaming.

Sometimes this adjustment for the tooth or teeth is required parallel with the axis of rotation of the tool, or substantially so, other times radial adjustment is required and frequently adjustment in both directions is required. One of the important objects of the present invention is to provide a tool assembly in which both radial and longitudinal adjustments of the tooth or teeth may be conveniently and accurately accounted for without sacrificing economical production or incurring other objectionable structural features.

While the foregoing statement is indicative in a general way of the nature of the invention other objects and advantages will be apparent upon a full understanding of the construction and cooperative relationship of the several parts of the tool assembly.

One form of the invention is presented herein by way of exemplification but it will of course be understood that the invention is susceptible of embodiment in still other structurally modified forms without departing from the spirit of the invention as defined in the sub-joined claim.

In the accompanying drawings:

Fig. 1 is a view in section, taken on the line 1—1 of Fig. 3;

Fig. 2 is a section, taken on the line 2—2 of Fig. 1;

Fig. 3 is a detailed view in perspective of a portion of the tool assembly and;

Fig. 4 is a view in section, taken on the line 4—4 of Fig. 1.

Referring now to the drawings in detail, the part 5 is a body portion and for the purpose of illustration can represent either a milling cutter head or other tooth holder depending upon the application of the invention. For convenience the part 5 will be referred to throughout the specification and claim as a head and such term must be construed to include any part which serves in the same general capacity.

According to the preferred embodiment of the invention the head 5 is made substantially in the form of a relatively heavy ring member having a central opening as at 6 for accommodating a spindle or other mounting whereby the tool may be carried for rotary movement. In a case of a milling cutter a plurality of teeth such as 7 would be inset at spaced intervals in the circumference of the head 5 and the cutting edges of these teeth may be presented crosswise or substantially crosswise to the axis of rotation of the tool, as in the case of a face cutter, or the cutting edges of the teeth may be presented parallel or substantially parallel with the axis of rotation of the tool. The teeth 7 occupy peripheral slots 8 in the head 5 and according to the present invention means are provided for effecting both radial and longitudinal adjustment of the teeth in the slots.

First of all the slots 8 are made wider than the thickness of the teeth so that when the teeth occupy the slots a space 9 is left between one side of the teeth and one wall of the slots. The closed ends of the slots are also relieved by an enlarged cut away area 10. The side wall of each slot opposite the space 9 which is left when the teeth are in place, is serrated as at 11 and these serrations extend radially of the head or in other words from the top to the bottom of the slots. The side of the teeth adjacent the serrations 11 are also provided with companion serrations 12 which interlock with the serrations 11. These interlocking serrations 11 and 12 avoid any movement of the teeth parallel with the axis of the tool yet they allow for radial and longitudinal adjustment of the teeth when the clamping means, which will be presently described, has been released.

Commencing in the circular opening 6 of the head 5 are openings 13 which extend radially into the head and lead into the slots 8. The closed ends of these openings 13 provide internal bores 14 for the reception of the teeth lifting members 15 each of which has a disk-like head 16 and a threaded shank 17. The shank 17 is threaded into a tapped hole 18 which extends from the outside of the head into the internal bore 14. The head 16 of each of these lifters is disposed under its respective tooth 7 and in contact therewith.

By inserting a key in the hexagonal opening 19 of the shank 17 of the lifter and turning the same to the right or left the head 16 of the lifter may be moved in either direction radially of the head and when the tooth 7 is released by the means which clamps it in any adjusted position, its radial adjustment may be accurately determined by its respective lifter.

The clamping means for each tooth preferably comprises a pair of set screws 20 which engage the side of the teeth opposite the serrations 12. To conveniently accommodate the set screws 20 the metal of the head 5 is cut away at intervals as at 21 to expose the heads 22 of the set screws and leave them conveniently accessible and it also provides lug like portions as at 23 in the head in which are provided the tapped holes for the set screws.

To effect a radial adjustment of the teeth a wrench is applied to the heads 22 of the set screws 20 and they are backed up to release their respective teeth. Lifter 15 may then be employed as previously described. It will not be necessary to completely disengage the serrations 11 and 12 to effect a radial adjustment of the teeth since the serrations extend in the same direction as that in which the teeth are moved for such an adjustment. This is quite desirable as it will allow for radial adjustments of the teeth without disturbing the predetermined longitudinal adjustment of the teeth. To longitudinally adjust the teeth it will be necessary to back up the set screws 20 far enough to provide a complete disengagement of the serrations 11 and 12. This accounts for leaving the space 9 between the side of the teeth and the wall of the slots.

From the above it will be seen that the invention provides a most effective means of rigidity and detachably holding the tooth or teeth in a mounting therefor and also provides effective means for permitting both radial and longitudinal adjustment of the teeth when occasion demands.

The headed lifting members not only serve as lifters, so as to speak, for the teeth but they also serve as variable depth supporting ledges for the teeth and in this particular capacity they are equivalent to means for varying the depth of the slots so far as concerns the support for the body of the teeth.

Having thus described and shown an embodiment of this invention, what I claim and desire to secure by Letters Patent of the United States is:

In an inserted tooth metal working tool, the combination of a ring-like head having a plurality of radially serrated peripheral slots, cutter teeth inserted in said slots each having serrations interlocking with the serrations in their respective slots, set screws entering the slots through side walls thereof for rigidly and releasably clamping the teeth in the slots and means for adjusting the inserted depth of the teeth in the slots and means for adjusting the inserted depth of the teeth in the slots, comprising a disk-like tooth supporting head for each tooth occupying a hollow area adjacent to and communicating with each slot, said disk-like heads being threaded into radial bores in the head and through which they are accessible for individual adjustment.

Signed at Rockford, in the county of Winnebago, and State of Illinois, this 29 day of April, 1930.

ARTHUR E. JACOBS.